United States Patent
Hunzinger

(10) Patent No.: US 8,279,770 B2
(45) Date of Patent: Oct. 2, 2012

(54) UPLINK TRANSMIT DIVERSITY ENHANCEMENT

(75) Inventor: Jason F. Hunzinger, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 12/549,260

(22) Filed: Aug. 27, 2009

(65) Prior Publication Data

US 2010/0080136 A1    Apr. 1, 2010

Related U.S. Application Data

(60) Provisional application No. 61/101,073, filed on Sep. 29, 2008.

(51) Int. Cl.
*H04W 4/00* (2009.01)
*H04L 12/26* (2006.01)

(52) U.S. Cl. .................. 370/252; 370/329; 455/452.1

(58) Field of Classification Search .................. 370/252, 370/254, 310, 328–332; 455/450–453
See application file for complete search history.

(56) References Cited

U.S. PATENT DOCUMENTS

| 2007/0258537 A1 | 11/2007 | Mailaender |
| 2008/0160922 A1 | 7/2008 | Sun et al. |
| 2009/0016372 A1* | 1/2009 | Tao et al. ............ 370/437 |
| 2010/0062717 A1* | 3/2010 | Brisebois et al. ........ 455/63.1 |

FOREIGN PATENT DOCUMENTS

| EP | 1381172 | 1/2004 |
| WO | WO2004015887 A1 | 2/2004 |
| WO | WO2005089384 | 9/2005 |
| WO | WO2008077113 | 6/2008 |

OTHER PUBLICATIONS

International Search Report—PCT/US2009/058876—International Searching Authority, European Patent Office, Aug. 26, 2010.

* cited by examiner

*Primary Examiner* — Kerri Rose
(74) *Attorney, Agent, or Firm* — Charles Chesney

(57) ABSTRACT

A method for uplink transmit diversity enhancement is described. Two or more potential uplink transmission configurations are determined. Each potential uplink transmission configuration is evaluated. An uplink transmission configuration is selected based on the evaluation. Metrics of the selected uplink transmission configuration are determined. Cycle adaptation parameters are adjusted. The selected uplink transmission configuration is applied for an extended use period.

28 Claims, 12 Drawing Sheets

UPLINK TRANSMIT DIVERSITY ENHANCEMENT

RELATED APPLICATIONS

This application is related to and claims priority from U.S. Provisional Patent Application Ser. No. 61/101,073 filed Sep. 29, 2008, for "Method and Apparatus for Transmit Diversity in a Wireless Communications System," with inventor Jason F. Hunzinger.

TECHNICAL FIELD

The present disclosure relates generally to communication systems. More specifically, the present disclosure relates to systems and methods for uplink transmit diversity enhancement.

BACKGROUND

Wireless communication systems are widely deployed to provide various types of communication content such as voice, video, data, and so on. These systems may be multiple-access systems capable of supporting simultaneous communication of multiple terminals with one or more base stations.

The term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

In the wireless communication network, data may be transmitted between the mobile station and the base station. The mobile device may use various configurations for transmitting data to the base station. Depending on channel conditions, one configuration may provide optimal transmission parameters. It would be beneficial if improvements were made relating to the selection of these various configurations for transmitting data to the base station.

DETAILED DESCRIPTION

Figure 1:
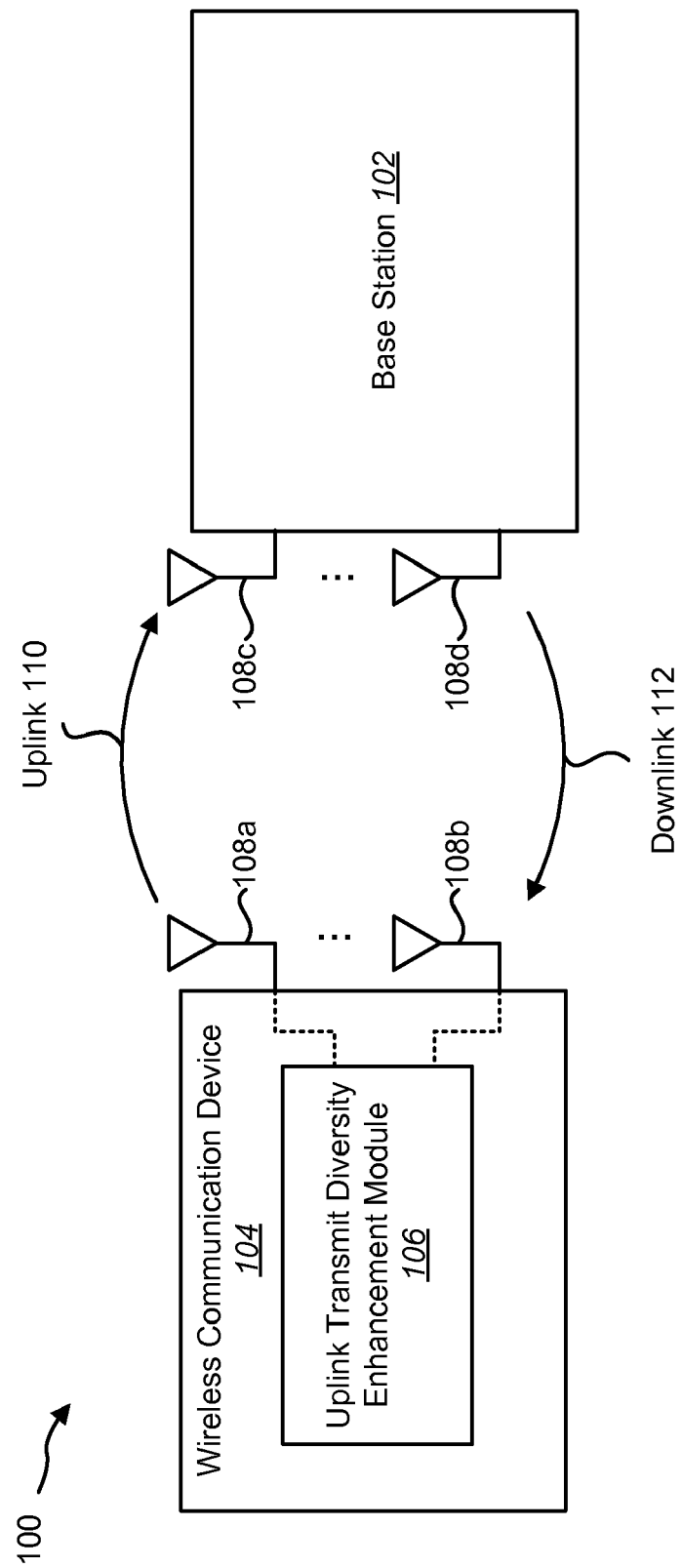
FIG. 1 shows a wireless communication system with multiple wireless devices.

A method for uplink transmit diversity is described. Two or more potential uplink transmission configurations are selected. Each potential uplink transmission configuration is evaluated. An uplink transmission configuration is selected based on the evaluation. Metrics of the selected uplink transmission configuration are determined. Cycle adaptation parameters are adjusted. The selected uplink transmission configuration is applied for an extended use period on a wireless communications device.

The two or more potential uplink transmission configurations may be determined. Each potential uplink transmission configuration may include a phase configuration. Each potential uplink transmission configuration may include an antenna configuration. An uplink transmission configuration may specify beamforming techniques for the wireless communications device.

Evaluating each potential uplink transmission configuration may include performing an uplink transmission configuration test for a current cycle to obtain a mean transmit power. A relative metric of each potential uplink transmission configuration may be computed. A normalized relative metric for each potential uplink transmission configuration may be computed. An autocorrelation of the normalized relative metric may be calculated for each potential uplink transmission configuration.

Performing an uplink transmission configuration test may include using the uplink transmission configuration for uplink transmissions during an uplink transmission testing period. The cycle adaptation parameters may include an uplink transmission testing period, an evaluation period, and an extended use period. The wireless communications device may include two or more antennas. The wireless communications device may be configured to operate using multiple-in multiple-out (MIMO).

A wireless device configured for uplink transmit diversity is also described. The wireless device includes a processor. The wireless device also includes memory in electronic communication with the processor. The wireless device further includes instructions stored in the memory. The instructions are executable by the processor to select two or more potential uplink transmission configurations. The instructions are also executable by the processor to evaluate each potential uplink transmission configuration. The instructions are further executable to select an uplink transmission configuration based on the evaluation. The instructions are also executable to determine metrics of the selected uplink transmission configuration. The instructions are further executable to adjust cycle adaptation parameters and to apply the selected uplink transmission configuration for an extended use period.

A wireless device configured for uplink transmit diversity is described. The wireless device includes means for selecting two or more potential uplink transmission configurations. The wireless device also includes means for evaluating each potential uplink transmission configuration. The wireless device further includes means for selecting an uplink transmission configuration based on the evaluation. The wireless device also includes means for determining metrics of the selected uplink transmission configuration. The wireless device further includes means for adjusting cycle adaptation parameters. The wireless device also includes means for applying the selected uplink transmission configuration for an extended use period.

A computer-program product for a wireless device configured for uplink transmit diversity is described. The computer-program product includes a computer-readable medium having instructions thereon. The instructions include code for selecting two or more potential uplink transmission configurations. The instructions also include code for evaluating each potential uplink transmission configuration. The instructions further include code for selecting an uplink transmission configuration based on the evaluation. The instructions also include code for determining metrics of the selected uplink transmission configuration. The instructions further include code for adjusting cycle adaptation parameters. The instructions also include code for applying the selected uplink transmission configuration for an extended use period.

FIG. 1 shows a wireless communication system 100 with multiple wireless devices. A wireless device may be a base station 102, a mobile device, a controller, or the like. A base station 102 is a station that communicates with one or more wireless communication devices 104. A base station 102 may also be referred to as, and may include some or all of the functionality of, an access point, a broadcast transmitter, a Node B, an evolved Node B, etc. The term "Base Station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc. A wireless communication device 104 may communicate with zero, one, or multiple base stations 102 on the downlink 112 and/or uplink 110 at any given moment. The downlink 112 (or forward link) refers to the communication link from a base station 102 to a wireless communication device 104, and the uplink 110 (or reverse link) refers to the communication link from a wireless communication device 104 to a base station 102.

Communication between a wireless communication device 104 in a wireless system (e.g., a multiple-access system) and a base station 102 is achieved through transmissions over a wireless link comprised of a forward link and a reverse link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple ($M_T$) transmit antennas and multiple ($M_R$) receive antennas for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The wireless communication system 100 may utilize MIMO. At the transmitter, each portion of a data stream may be transmitted from a different antenna 108. At the receiver, the different portions of the data stream may be received by different antennas and then combined.

Recent $3^{rd}$ Generation Partnership Project (3GPP) standards-related efforts for the Universal Mobile Telecommunications System (UMTS) Terrestrial Radio Access Network (UTRAN) have begun to consider closed-loop methods to overcome the limitations of existing open-loop methods. This may include specifying feedback information from the UTRAN to a wireless communication device 104.

The wireless communication system 100 may utilize transmit diversity. In transmit diversity, signals originating from multiple independent sources that have been modulated with identical information bearing signals are transmitted. In transmit diversity, the transmission characteristics of the signals may vary. Significant performance gains may be achieved by using longer cycles and thus lower duty cycle when an uplink transmission configuration has longer-term advantages, thus avoiding the disadvantage of uplink transmission configuration testing. Shorter cycles may be used when rapid uplink transmission configuration selection may reflect channel dynamics. Thus, the best uplink transmission configuration or at least an acceptable uplink transmission configuration may be used.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, and spatial division multiple access (SDMA) systems.

The wireless communication device 104 may communicate with a base station 102 using uplink transmit diversity enhancement. In uplink transmit diversity enhancement, potential uplink transmission configurations may be tested periodically to determine an optimal uplink transmission configuration. The potential uplink transmission configuration with the best or at least acceptable merits (i.e. with the best or at least acceptable metrics) may be selected as the optimal uplink transmission configuration. Uplink transmit diversity enhancement is discussed in further detail below in relation to FIG. 2.

In closed loop uplink transmit diversity enhancement, the base station 102 may determine transmit diversity modifications for the wireless communication device 104. The base station 102 may then send the transmit diversity modifications to the wireless communication device 104. In open loop uplink transmit diversity enhancement, the wireless communication device 104 may autonomously make decisions concerning transmit diversity. However, the base station 102 may send feedback information to the wireless communication device 104 which may directly or indirectly indicate a measure of uplink transmit diversity performance. One disadvantage of open loop uplink transmit diversity is that feedback induced by testing uplink transmission configurations may be indirect and/or delayed. Furthermore, open loop uplink transmit diversity may have limited feedback/information (errors, imprecision).

One advantage of open loop uplink transmit diversity is that no additional uplink pilot overhead may be needed. Furthermore, no additional downlink feedback overhead may be needed. Also, no additional synchronization may be required between the wireless communication device 104 and the base station 102. Open loop uplink transmit diversity is also not limited by protocol restraints (e.g. phase resolution, timing, etc.).

The present systems and methods may be used in the context of open loop uplink transmit diversity or closed loop uplink transmit diversity. The wireless communication device 104 may include an uplink transmit diversity enhancement module 106. The uplink transmit diversity enhancement module 106 is discussed in further detail below in relation to FIG. 3.

The uplink transmit diversity enhancement module 106 may generate uplink transmissions. The uplink transmissions may be transmitted by the wireless communication device 104 via one or more antennas 108a-b. Each antenna 108 may be controlled by the uplink transmit diversity enhancement module 106. The uplink transmissions may be received by the base station 102 via one or more antennas 108c-d.

Figure 2:
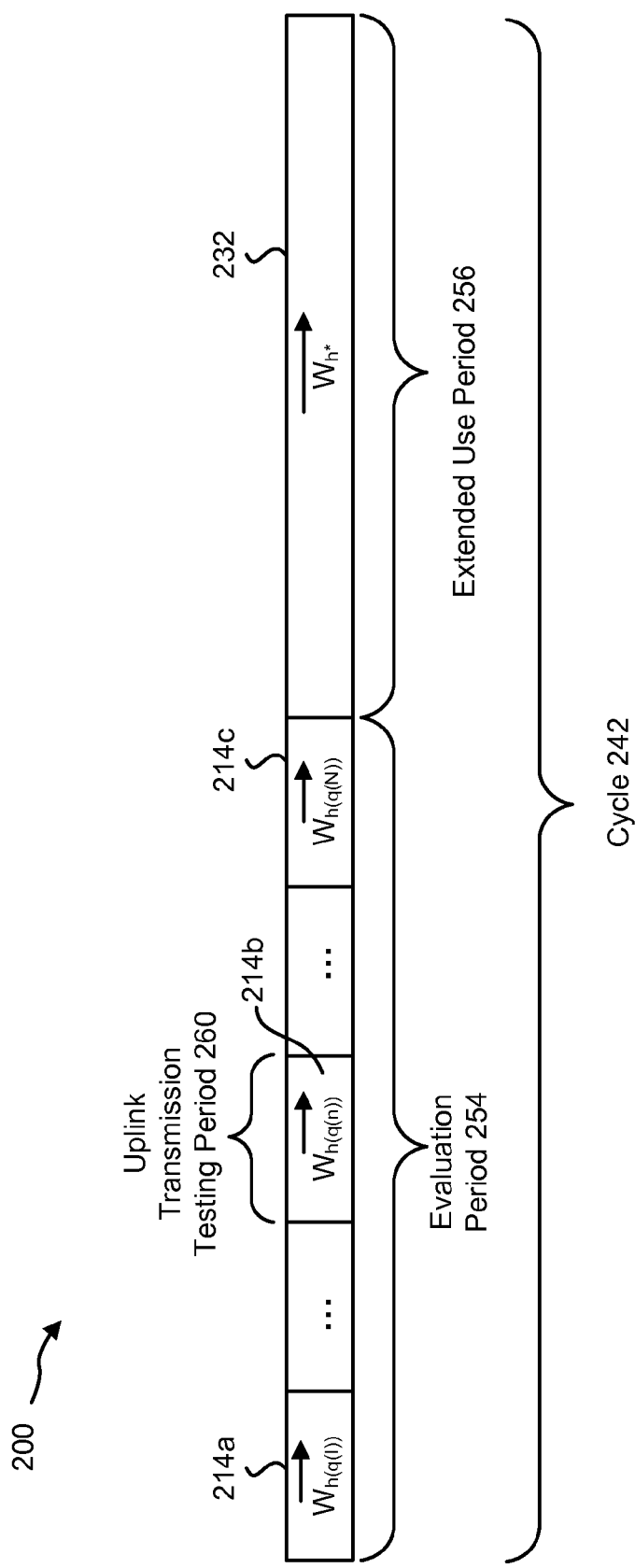
FIG. 2 illustrates a cycle of transmit diversity uplink enhancement.

FIG. 2 illustrates a cycle 200 of transmit diversity uplink enhancement. Transmit diversity uplink enhancement may also be referred to as adaptive PhaseSweep. The uplink transmit diversity method uses a sequence of cycles 242. In each cycle 242, an uplink transmission configuration is selected from a set of potential uplink transmission configurations H by testing each of the potential uplink transmission configurations during an evaluation period 254. Each potential uplink transmission configuration is tested for an uplink transmission configuration testing period 260 (L slots each). Each uplink transmission configuration may apply beamforming weights 214a-c to two or more antennas 108 used by the wireless communication device 104. The beamforming weights 214 may be represented as $\vec{w}_{h(i)} \in W$ where $$\vec{w} = (w_0, w_1), w_i = a_i e^{j\theta}, \sum_i |w_i| = 1.$$

A selected uplink transmission configuration may apply a beamforming weight 232 during an extended use period 256.

A measure may be used to compare the uplink transmission configurations. One example of a measure may be uplink transmit power. The mean transmit power y(i) of the wireless communication device 104 may be measured for each potential uplink transmission configuration h(i) (where i is the slot index). The optimal uplink transmission configuration h*, which has the minimum mean transmit power (denoted as slot indices I(d,n,h), where n is the cycle index, d is the uplink transmission configuration testing rate, and h is the potential uplink transmission configuration index), may be selected. The optimal uplink transmission configuration h* may then be used for an extended use period 256. In PhaseSweep, the extended use period 256 is the next |H|L(1/d−1) slots (where 1/d is the duty cycle length multiplier, typically equaling 21). Thus, in PhaseSweep, the extended use period 256 has a fixed duration. The selection of h* may be found using Equation (1):

$$h^* = \underset{h}{\mathrm{argmin}}(\hat{y}_d^-(h, n)) \quad (1)$$

where Equation (2) applies:

$$\hat{y}_d^-(h, n) = \frac{1}{L} \sum_{i \in I(d,n,h)} y(i). \quad (2)$$

If the wireless communication device 104 uses transmit diversity uplink enhancement, the duration of the evaluation period 254, extended use period 256, and cycle 242 may be adjusted. In one possible configuration, the nominal extended use period 256 may be approximately 20 times the evaluation period 254. The extended use period 256 may have a limited dynamic range that allows additions of up to about 43 seconds and down to about 125 milliseconds (ms), for example. The uplink transmission configuration testing period 260 may be reduced down to 25 slots or less. In channel conditions in which enhanced uplink transmit diversity may have limited benefit, either the extended use period 256 may be limited to a nominal range or value, or the uplink transmit diversity method may be disabled. The detailed methods for accomplishing this, including considering the correlation of metrics and performance, will be discussed further below. The performance of uplink transmission configuration selection depends on whether the metrics of a potential uplink transmission configuration during an evaluation period 254 is correlated with the metrics of the potential uplink transmission configuration during the subsequent extended use period 256. However, the testing of alternative potential uplink transmission configurations which have, in retrospect, sub-optimal metrics will negatively impact performance.

The negative impact of alternative potential uplink transmission configurations relative to the optimal uplink transmission configuration, other factors being equal, increases as the evaluation rate of the evaluation period 254 increases. One tradeoff is the balance of minimizing the evaluation rate against applying the optimal uplink transmission configuration during the extended use periods 256. For example, there may be a tradeoff between the negative effect of using an uplink transmission configuration during the evaluation period 254 and the positive effect from using an optimal uplink transmission configuration during the extended use period 256. The positive and negative effects may be referred to as metrics. The positive effect may be referred to as an advantage metric and the negative effect may be referred to as a disadvantage metric.

Figure 3:
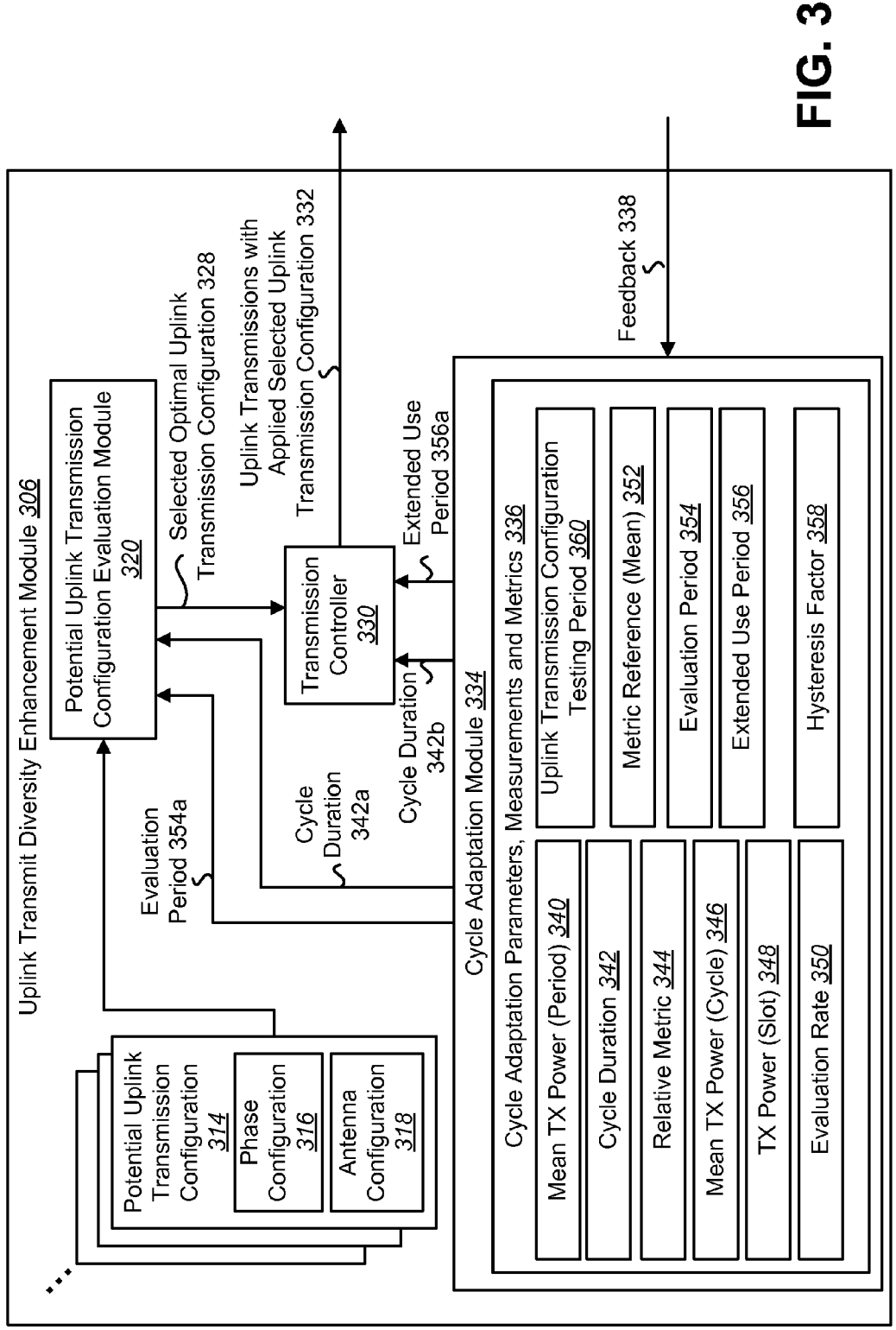
FIG. 3 is a block diagram illustrating an uplink transmit diversity enhancement module.

FIG. 3 is a block diagram illustrating an uplink transmit diversity enhancement module 306. The uplink transmit diversity enhancement module 306 of FIG. 3 may be one configuration of the uplink transmit diversity enhancement module 106 of FIG. 1.

The uplink transmit diversity enhancement module 306 may include multiple potential uplink transmission configurations 314. Each potential uplink transmission configuration 314 may describe a particular beamforming used by a wireless communication device 104 for uplink transmissions. Each potential uplink transmission configuration 314 may include a phase configuration 316. For example, each phase configuration 316 may apply a phase offset to uplink transmissions. In one configuration, four phase offsets of 90 degrees may be used. Each potential uplink transmission configuration 314 may also include an antenna configuration 318. The antenna configuration 318 may define the antenna usage for the wireless communication device 104 during uplink transmission. For example, in a wireless communication device 104 with two antennas 108, each antenna configuration 318 may define whether an antenna 108 is on or off during uplink transmissions. Potential uplink transmission configurations 314 may also include magnitude differences between two or more antennas.

A potential uplink transmission configuration evaluation module 320 may evaluate each of the potential uplink transmission configurations 314. The potential uplink transmission configuration evaluation module 320 may test each potential uplink transmission configuration 314 (or a subset thereof) for an uplink transmission configuration testing period 360 during an evaluation period 354 as part of a cycle 342. The potential uplink transmission configuration evaluation module 320 may receive the evaluation period 354*a* (or alternatively the testing period 360) and the cycle duration 342*a* (or equivalently the duty cycle) from a cycle adaptation module 334. The potential uplink transmission configuration evaluation module 320 may then select an optimal uplink transmission configuration 328. The potential uplink transmission configuration evaluation module 320 may send the optimal uplink transmission configuration 328 to a transmission controller 330.

The transmission controller 330 may apply the optimal uplink transmission configuration 328 to uplink transmissions 332. The optimal uplink transmission configuration 328 may be applied to uplink transmissions 332 for an extended use period 356 as part of a cycle 342. The transmission controller 330 may receive the extended use period 356*a* and the cycle duration 342*b* from the cycle adaptation module 334.

The cycle adaptation module 334 may receive feedback 338. In closed loop uplink transmit diversity, the feedback 338 may include new values for the evaluation period 354, the extended use period 356, and the cycle duration 342. In open loop uplink transmit diversity, the feedback 338 may include incremental increases and/or incremental decreases in the transmit power for the wireless communication device 104.

The cycle adaptation module 334 may include cycle adaptation parameters, measurements and metrics 336. The cycle adaptation parameters, measurements and metrics 336 may be measured/determined by the wireless communication device 104. Alternatively, some of the cycle adaptation parameters, measurements and metrics 336 may be received from a base station 102. The cycle adaptation parameters, measurements and metrics 336 may include measurements of uplink transmission configuration performance, such as the measured mean transmission power 340 for an uplink transmission configuration testing period $\bar{y}_d^-(c)(h,c)$ (cycle c, potential uplink transmission configuration h). The mean transmission power 340 may generally be a cost or a demerit "−". In other words, testing a sub-optimal uplink transmission configuration may result in a higher transmission power and thus a decrease in performance. The cycle adaptation parameters, measurements and metrics 336 may also include a metric reference (mean) 352

$$\bar{y}_d^r(c) \equiv \sum_{h \in H} \bar{y}_d^-(h,c).$$

The metric reference (mean) 352 may provide a perspective on a minimum performance level for the wireless communication device 104. The cycle adaptation parameters, measurements and metrics 336 may further include a relative metric 344 $\Delta m_d(h,c) \equiv \min(0, \bar{y}_d^-(h,c) - \bar{y}_d^r(h,c))$. The relative metric 344 may provide a perspective on gain.

The cycle adaptation parameters, measurements and metrics 336 may include an uplink transmission configuration testing period $T_h(n)$ 360, where n=[1 . . . N] within the cycle.

The cycle adaptation parameters, measurements and metrics 336 may also include an evaluation period 354

$$T_e \equiv \sum_{n=1}^{N} T_h(n) = N\bar{T}_h,$$

an extended use period $T_u$ 356, and a cycle duration 342 $T_c \equiv T_e + T_u$. The cycle adaptation parameters, measurements and metrics 336 may further include an evaluation rate 350

$$d \equiv \frac{T_e}{T_c}.$$

The cycle adaptation parameters, measurements and metrics 336 may additionally include considerations of the tradeoff between testing and cycle duration or factors relating to the tradeoff such as a mean transmission power (cycle) 346 for a given duty cycle d:

$$\bar{y}(d,n) \equiv \frac{d}{N\bar{T}_h} \left[ \sum_{i \in I(d,c)} y(h(i),i) + \sum_{i \in U(d,c)} y(h^*(c),i) \right].$$

The mean transmission power (cycle) 346 may thus represent the mean transmission power for the wireless communication device 104 over the course of an entire cycle 242. The cycle adaptation parameters, measurements and metrics 336 may also include a hysteresis factor 358. The hysteresis factor 358 may define incremental changes to the cycle duration 342. The cycle duration 342 may be increased or decreased by the hysteresis factor 358 if an upper threshold is exceeded or a lower threshold is not exceeded. The hysteresis factor 358 is discussed in further detail below in relation to FIG. 6. The cycle adaptation parameters, measurements and metrics 336 may also include the transmission (Tx) power (slot) 348. The Tx power (slot) 348 may represent the transmission power at the end of each uplink transmission configuration testing period 260 for each uplink transmission configuration 314 during the evaluation period 254.

Figure 4:
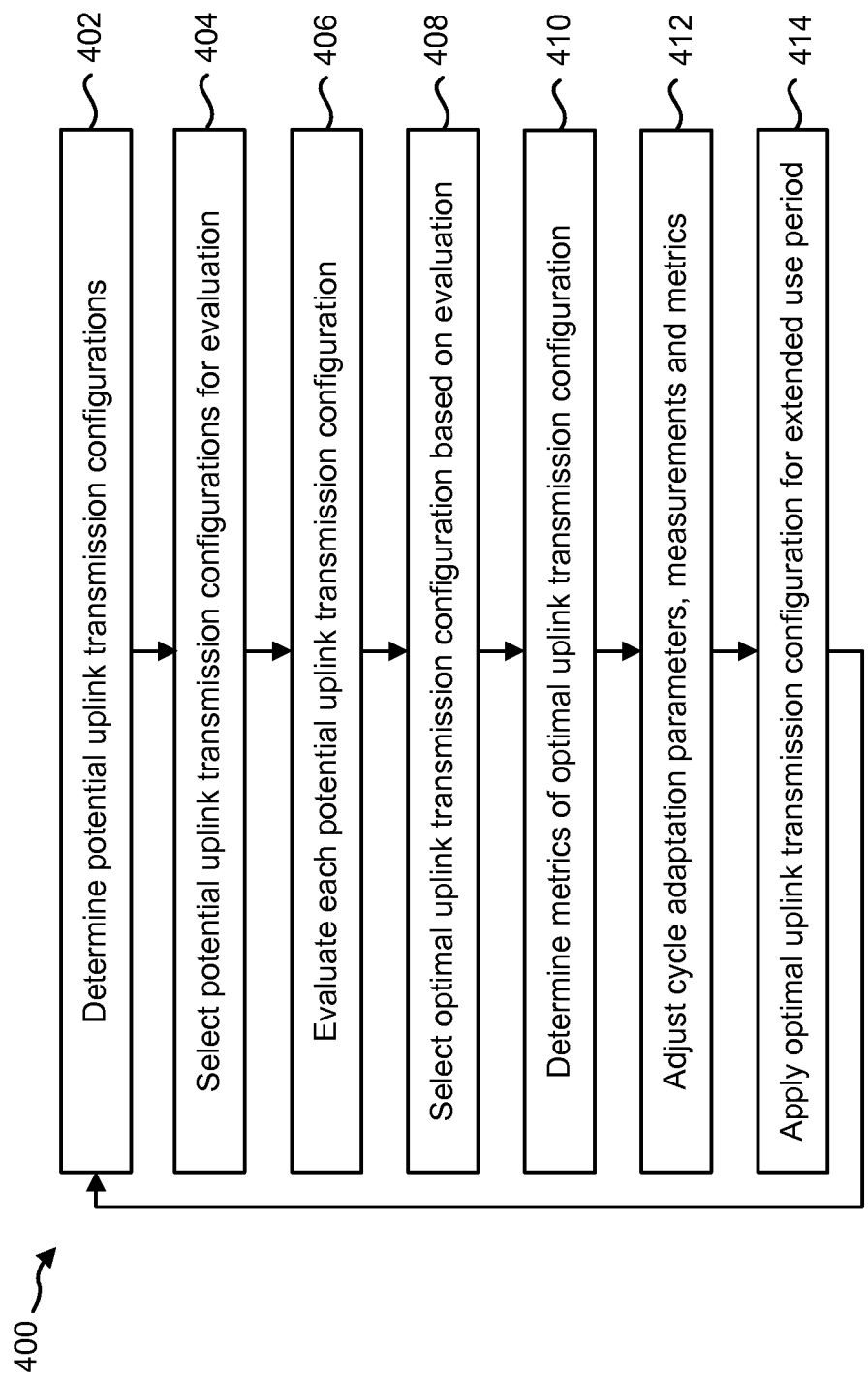
FIG. 4 is a flow diagram illustrating a method for uplink transmit diversity enhancement.

FIG. 4 is a flow diagram illustrating a method 400 for uplink transmit diversity enhancement. The method 400 may be performed by a wireless communication device 104. The wireless communication device 104 may determine 402 two or more potential uplink transmission configurations 314 for evaluation. As discussed above in relation to FIG. 3, each potential uplink transmission configuration 314 may define uplink transmission configurations. The wireless communication device 104 may select 404 the potential uplink transmission configurations 314 for evaluation. For example, the wireless communication device 104 may select only potential uplink transmission configurations 314 that match current channel conditions.

The wireless communication device 104 may then evaluate 406 each potential uplink transmission configuration 314. Each potential uplink transmission configuration 314 may be evaluated 406 each cycle 242. The wireless communication device 104 may evaluate 406 a potential uplink transmission configuration 314 by testing the potential uplink transmission configuration 314 for an uplink transmission testing period 260. During the uplink transmission testing period 260, the wireless communication device 104 may send uplink transmissions using the uplink transmission configuration defined in the potential uplink transmission configuration 314. The wireless communication device 104 may then use evaluation metrics to select 408 an optimal uplink transmission configuration 328 based on the evaluation. Evaluation metrics may include the wireless communication device 104 pilot transmission power, integrated power control, and the mean wireless communication device 104 transmission power.

Uplink power control is typically accomplished by feedback in the form of up or down commands from the base station 102. The wireless communication device 104 may respond to power control in steps (e.g. up or down by 1 dB). The cumulative effect of power control can be represented as the integral of the power control steps. A wireless communication device 104 may transmit pilot channel(s), control channel(s) and data channels. The control and data channel power may be determined by offsets from the pilot and may vary depending on the payload (modulation, rate and coding). While the power may vary over a test duration, the mean power (e.g. of the pilot or total) may be used as an alternative measure of the test performance rather than integrated power control.

The wireless communication device 104 may next determine 410 metrics of the optimal uplink transmission configuration 328 for the extended use period 256. The wireless communication device 104 may then adjust 412 cycle adaptation parameters 336. The wireless communication device 104 may apply 414 the optimal uplink transmission configuration 328 to uplink transmissions 332 for an extended use period 256.

Figure 5:
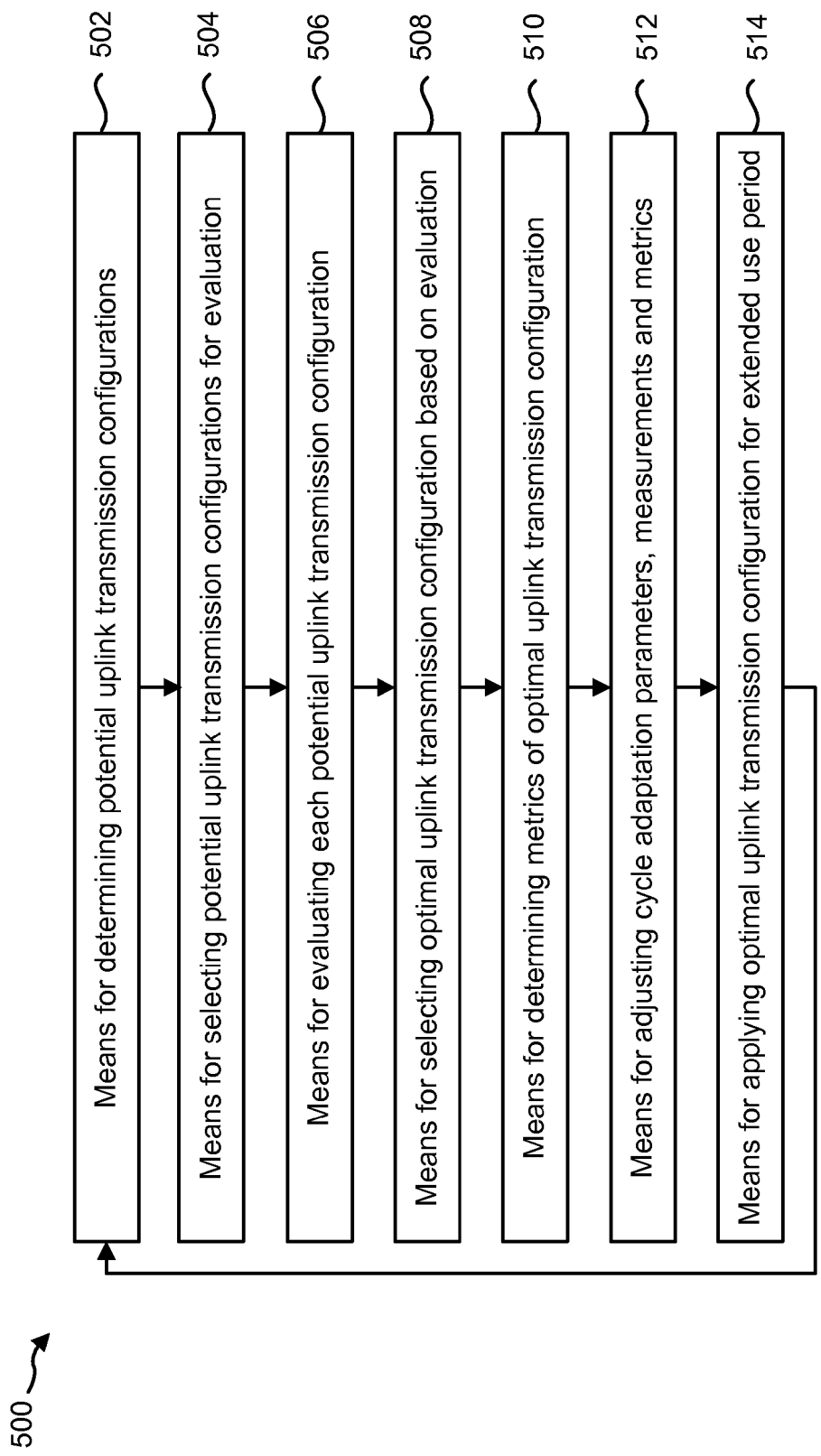
FIG. 5 illustrates means-plus-function blocks corresponding to the method of FIG. 4.

The method 400 of FIG. 4 described above may be performed by various hardware and/or software component(s) and/or module(s) corresponding to the means-plus-function blocks 500 illustrated in FIG. 5. In other words, blocks 402 through 414 illustrated in FIG. 4 correspond to means-plus-function blocks 502 through 514 illustrated in FIG. 5.

Figure 6:
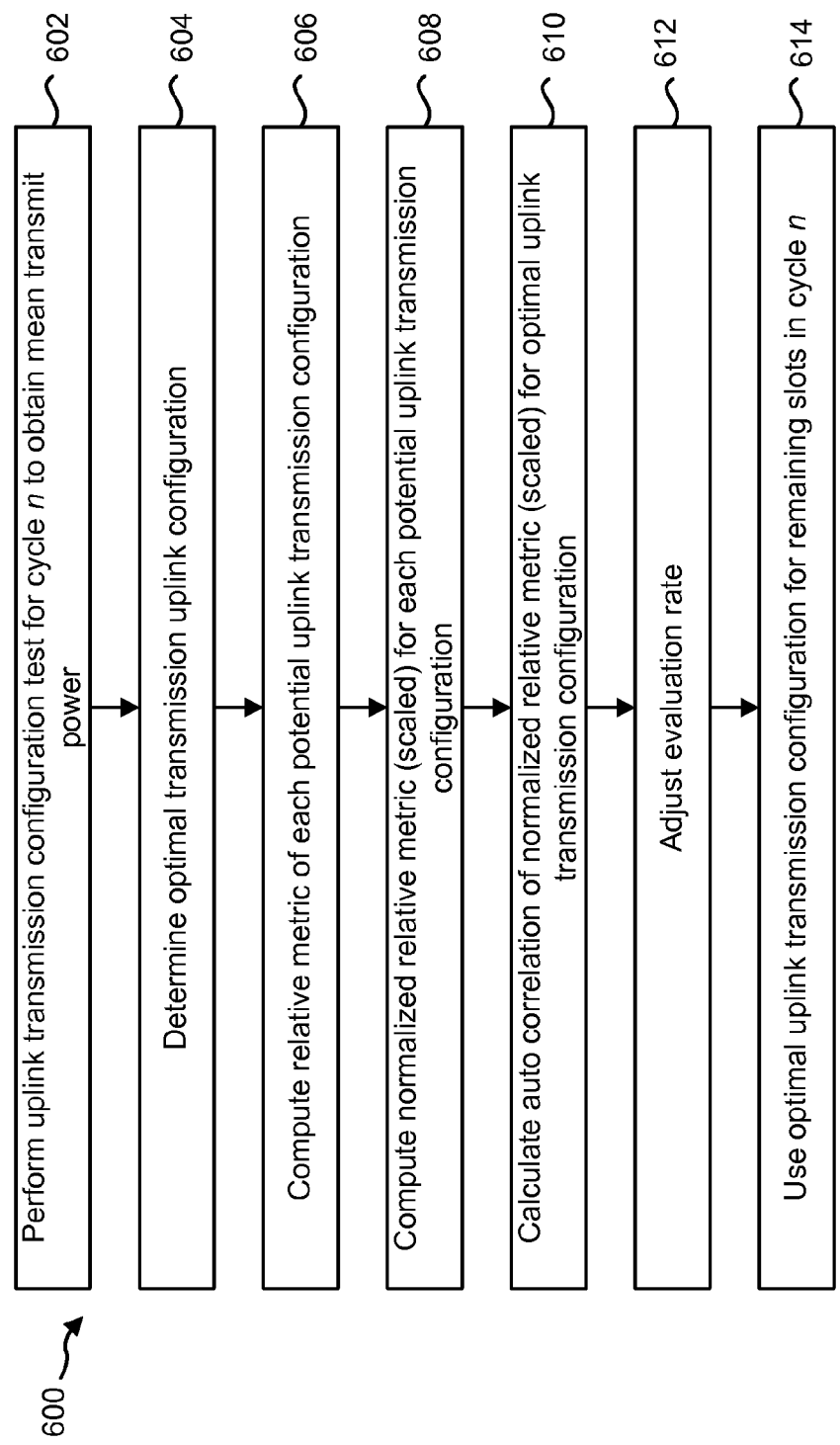
FIG. 6 is a flow diagram illustrating another method for uplink transmit diversity enhancement.

FIG. 6 is a flow diagram illustrating another method 600 for uplink transmit diversity enhancement. The method 600 may be performed by a wireless communication device 104 or an infrastructure device (such as a base station 102). The method 600 may be based on backward/forward estimation of the performance of using faster or slower uplink transmission configuration testing rates and a least squares linear prediction of the next cycle performance using the autocorrelation of a Normalized Relative Merit (NRM).

The wireless communication device 104 may perform 602 an uplink transmission configuration test for cycle n to obtain a mean transmit power 340 for the tested potential uplink transmission configuration h 314. The mean transmit power 340 for all of h may be represented as $\bar{y}_d^-(h,n)$. The wireless communication device 104 may then determine 604 the optimal uplink transmission configuration using Equation (3):

$$h^{*(n)} = \arg\min(\hat{y}_d^-(h,n)). \quad (3)$$

The minimization of Equation (3) may be restricted to those potential uplink transmission configurations 314 with better auto-correlation (i.e. those uplink transmission configurations whose tests are better indicators of good future performance over an extended duration). The wireless communication device 104 may then compute 606 a relative metric 344 of each potential uplink transmission configuration 314 using Equation (4):

$$\Delta m_d(h,n) = \min(0, \bar{y}_d^-(h,n) - \bar{y}_d^r(n)) \quad (4)$$

where $\bar{y}_d^r(n)$ of Equation (4) is found using Equation (5):

$$\bar{y}_d^r(n) \equiv \frac{1}{|H|} \sum_{h \in H} \bar{y}_d^-(h,n). \quad (5)$$

The min function of Equation (4) may clip to zero (0) the relative metric of potential uplink transmission configurations 314 which are worse than average.

The wireless communication device 104 may then compute 608 a normalized relative metric (scaled) for each potential uplink transmission configuration 314 using Equation (6):

$$m_d(h,n) \equiv \frac{\Delta m_d(h,n)}{\Delta m_d(h^{*(n)},n)}. \quad (6)$$

If $N_{adapt}$ cycles have passed since the last evaluation rate 350 adaptation (i.e. $n - n_{last} > N_{adapt}$ where $N_{adapt} \geq 1$ is configurable), the wireless communication device 104 may calculate 610 an autocorrelation of the normalized relative metric (scaled) for the optimal uplink transmission configuration 328 using Equation (7):

$$r_d(h,1) = \frac{1}{N} \sum_{j=n-N}^{n-1} m_d(h,j) m_d(h,j+1). \quad (7)$$

N is a configurable parameter and may be chosen in conjunction with $N_{adapt}$. The condition of $N_{adapt}$ cycles is optional. In one configuration, the adaptation is done every cycle. If an infinite impulse response (IIR) filter is used, the wireless communication device 104 may calculate 610 an autocorrelation of the normalized relative metric (scaled) for the optimal uplink transmission configuration 328 using Equation (8):

$$r_d(h,1,n) = \mu[m_d(h,n-1) m_d(h,n)] + (1-\mu) r_d(h,1,n-1). \quad (8)$$

In Equation (8), the constant m is given by the time constant (i.e. for the impulse response over N cycles to be −3 dB (or −k=−2 in base 2)) using Equation (9):

$$2\log_2(1-\mu)^N = -k \quad (9)$$
$$\mu = 1 - 2^{\frac{k}{2N}}.$$

The wireless communication device 104 may then compute the thresholds $c_a(d)$ for $a = [-1, 0, +1]$ (or precomputed for each valid evaluation rate d and a combination) using Equation (10):

$$c_a(d) = \frac{1 - 2^{2-a}d}{1 - 2^{1-a}d} \cong 1 - 2^{1-a}d. \quad (10)$$

The approximation is optional and may be omitted, particularly if the duty cycle is significantly large. In either case, the wireless communication device 104 may then adjust 612 an evaluation rate 350. The wireless communication device 104 may adapt the evaluation rate 350 if the autocorrelation is outside the thresholds ($c_{min}$ is the minimum nominal correlation which is close to 0; uplink transmission configuration testing may not provide any benefit to values below $c_{min}$) using Equation (11):

$$d(n) = \begin{cases} \max\left(d_{min}, \frac{1}{2}d\right) & r_d(h^{*(n)}, 1) > c'_{+1}(d) \\ \min(d_{max}, 2d) & c_{min} < r_d(h^{*(n)}, 1) < c'_{-1} \\ \min(d_{nom}, 2d) & r_d(h^{*(n)}, 1), < c_{min} \end{cases} \quad (11)$$

where d=d(n−1) (the prior value) and the c' terms are defined using Equation (12):

$$c'_{+1}(d) = (1-c_h)c_0(d) + (c_h)c_{+1}(d)$$

$$c'_{-1}(d) = (1-c_h)c_0(d) + (c_h)c_{-1}(d) \quad (12)$$

where $c_h=[0, 1]$ is a hysteresis factor 358 and $c_{min}$ and $d_{nom}$ are configuration parameters that may optionally be used to default to a nominal rate in cases of low correlation rather than shortening the cycle. The cycle duration 342 may thus be increased if an upper threshold is exceeded and decreased if a lower threshold is not exceeded. A nominal or default cycle duration 342 may be used if the correlation is below a minimum.

When limits on d are applied (as in Equation (11)), there may be no benefit to shortening the cycle length if even the shortest length would not have a reasonable auto-correlation and thus $c_{min}$ may be set to the c(d) bound for $d_{max}$. This may be implemented by masking on or off (selectively skipping) potential uplink transmission configuration tests. However, any value of u=1/d could be used to allow improved granularity. Various alternatives are possible for the definition of c'. If the evaluation rate has changed (i.e. d(n) not equal to d(n−1)) $n_{last}$ may be set equal to n. The optimal uplink transmission configuration 328 may then be used 614 for the remaining slots in the cycle n.

The convergence rate of a potential uplink transmission configuration 314 should not be confused with the convergence rate of the cycle length adaptation. Performance may be governed by the potential uplink transmission configuration 314 in use while the cycle 242 is a loop outside of the potential uplink transmission configuration 314 selection loop. Each potential uplink transmission configuration 314 (or cycle duration 342) may change without the other changing. A challenging situation for the potential uplink transmission configuration selection 314 is a step change in the best potential uplink transmission configuration 314, whether realistic or not after some duration of steady state.

For example, a step change in phase may occur due to motion which results in the blocking of one path and unblocking of another path, which is significant enough to warrant a clear uplink transmission configuration change. This situation may arise only if the uplink transmit diversity enhancement algorithm is permitted to adapt to a longer than nominal duration before the change in conditions, i.e. steady state is reached before a complete change. Of note is the delay between the step change in phase and the first use of a correct uplink transmission configuration subsequent to that time. If the number of potential uplink transmission configurations 314 is adequate, by definition, the noise would not contribute to an incorrect uplink transmission configuration choice and the convergence time will be, on average, half the maximum cycle duration 342 $1/(2d_{min})$ and at most just less than the maximum cycle duration $1/d_{min}$. This is because the most challenging situation is where the step change occurs just after the prior uplink transmission configuration test subperiod.

If the maximum cycle length is restricted to twice the nominal cycle length, then the additional convergence delay due to adaptation in this worst case, would be at most one nominal cycle length and, on average, half a nominal cycle length. Thus, the convergence rate of potential uplink transmission configuration 314 selection is fast even in the worst case or less than desirable cases.

The convergence of the cycle length adaptation is dependent on the auto-correlation length (or time constant) and the adaptation rate, if it is bounded. If there is a step change in the optimal uplink transmission configuration, the cycle length may drop to a nominal or shorter length unless the new potential uplink transmission configuration 314 was relatively optimal even before the step change. For example, if the auto-correlation of the new potential uplink transmission configuration 314 was high before the step, the cycle length may not shorten. This allows the algorithm to skip the negative effects of more frequent uplink transmission configurations even in a step change and may offset the convergence delay in the worst case. This separation between adaptations (choice of potential uplink transmission configuration 314 versus length of cycle) thus allows the uplink transmit diversity enhancement algorithm to perform with more flexibility.

So far, the uplink transmit diversity enhancement algorithm has been presented as an open-loop design where the wireless communication device 104 adapts the uplink transmission configuration cycle duration 342 autonomously based on observing the wireless communication device 104 transmit power. However, the wireless communication device 104 may adapt based on other metrics including information provided by the Universal Mobile Telecommunications System (UMTS) Terrestrial Radio Access Network (UTRAN) or information local to the wireless communication device 104. For example, the wireless communication device 104 may consider the correlation transmit power control commands of UP or DOWN to perform an uplink transmission configuration test if the test periods are kept short (i.e. short enough that they do not reach steady state of equal UP/DOWN probability). Furthermore, the algorithm could be implemented at the UTRAN. In such a scenario, the UTRAN may signal the wireless communication device 104 which uplink transmission configuration to use and when to (or when not to) execute a sweep so that the UTRAN can conduct measurements and determine the optimal uplink transmission configuration 328 to tell the wireless communication device to use.

Alternatively, the UTRAN may simply feedback 338 the adapted cycle duration 342 (or frequency) to the wireless communication device 104. Another variation on the above is the use of a different reference than the mean of the uplink transmission configuration tests. The metrics may be scaled or biased depending on measured values of the alternative potential uplink transmission configurations 314. For example, if the metrics of potential uplink transmission configuration testing is much higher than the metrics of average non-optimal uplink transmission configuration use, or vice versa, this can be accounted for by adjusting the reference.

Another variation on the above is to selectively test potential uplink transmission configurations 314. There may not be a reason to test every potential uplink transmission configuration 314 every cycle 242. For example, different potential uplink transmission configurations 314 may be tested on even or odd cycles 242. Alternatively, potential uplink transmission configurations 314 may be tested at a frequency depending on whether they are likely to be optimal (based on prior tests or based on relations between tested potential uplink transmission configurations 314). Another alternative is to interleave potential uplink transmission configurations 314 instead of testing the potential uplink transmission configurations 314 one by one. This may allow for a more reliable evaluation since the time period of the test is spread out. This may also be combined with UP/DOWN transmit power control command correlation metrics discussed above since the individual uplink transmission configuration test sub-periods may be short.

Figure 7:
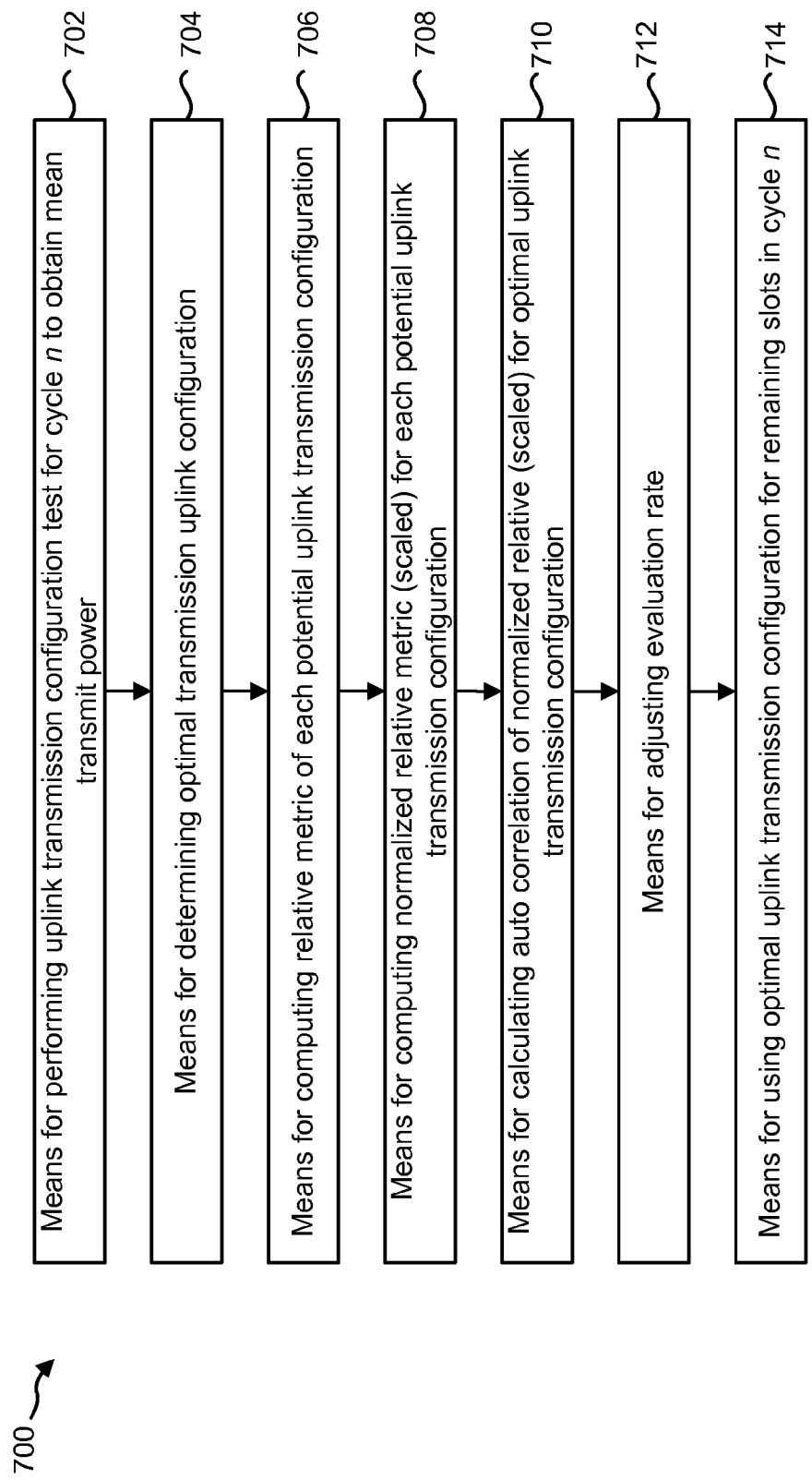
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 614 illustrated in FIG. 6 correspond to means-plus-function blocks 702 through 714 illustrated in FIG. 7.

Figure 8:
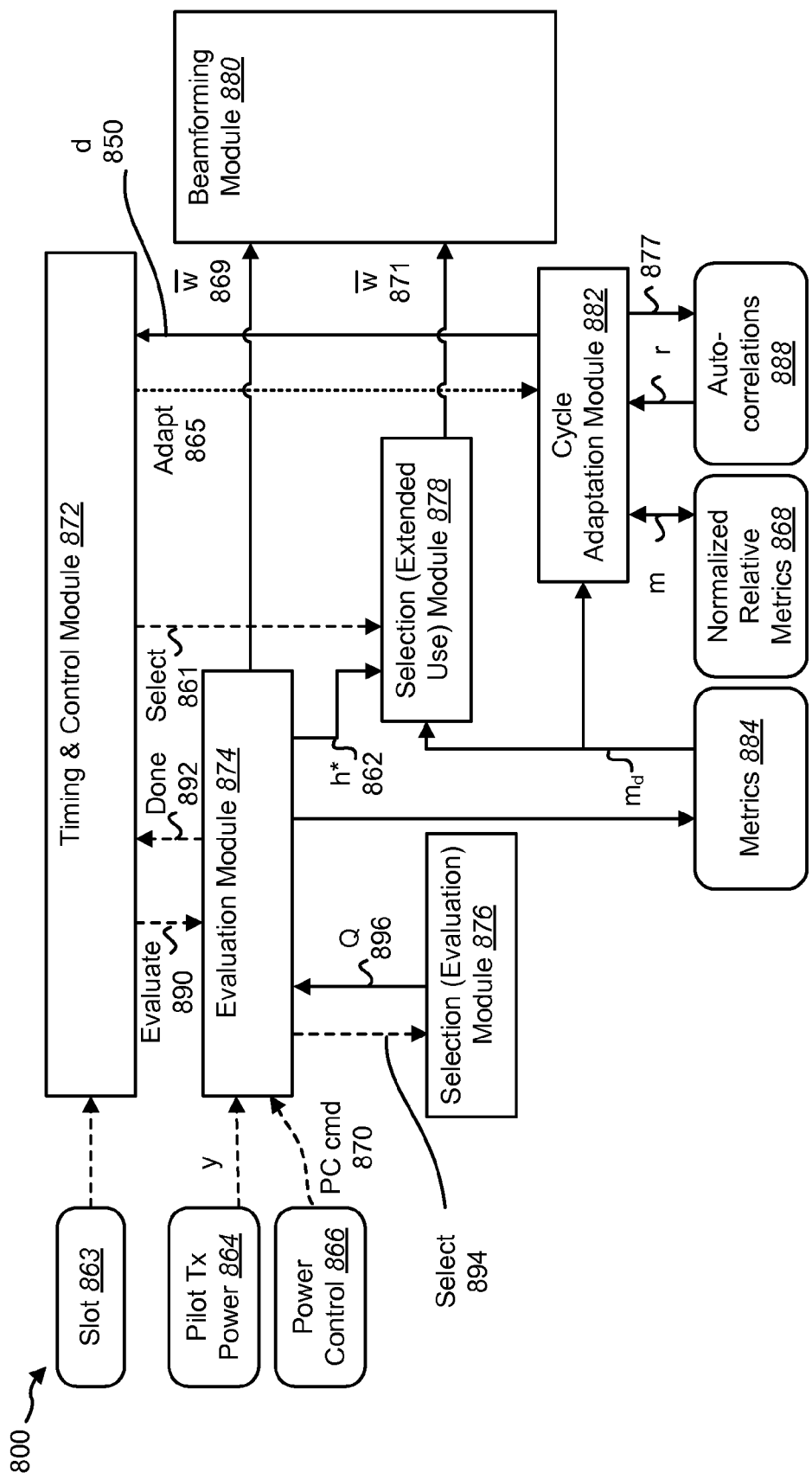
FIG. 8 is a block diagram illustrating data flows for uplink transmit diversity enhancement.

FIG. 8 is a block diagram illustrating data flows 800 for uplink transmit diversity enhancement. An evaluation module 874 may receive the pilot transmission power y 864 and power control 866 commands (PC cmd 870). In response to an evaluation request 890 from a timing and control module 872, the evaluation module 874 may request 894 the selection of potential uplink transmission configurations 314 from a selection (evaluation) module 876. The selection (evaluation) module 876 may provide two or more potential uplink transmission configurations Q 896 to the evaluation module 874, where Q 896 represents the sorting (non-unique) of the potential uplink transmissions 314 a(n)∈Q.

The evaluation module 874 may then evaluate the two or more potential uplink transmission configurations 314. The evaluation module 874 may apply each potential uplink transmission configuration 314 to a beamforming module 880. As discussed above, each uplink transmission configuration 314 may include phase configurations 316 and antenna configurations 318. The phase configurations 316 and antenna configurations 318 may be sent to the beamforming module as a collective weight $\overline{w}$ 869. The beamforming module 880 may then send uplink transmissions using the applied uplink transmission configurations. Metrics 884 of the evaluation may be stored. The evaluation module 874 may indicate to the timing and control module 872 when the evaluation is done 892.

The timing and control module 872 may send a select request 861 to a selection (extended use) module 878. The selection (extended use) 878 module may select an optimal uplink transmission configuration 862 from the potential uplink transmission configurations 314. The selection (extended use) module 878 may base the selection on the stored metrics 884. The evaluation module 874 may provide the optimal uplink transmission configuration 862 to the selection (extended use) module 878. Alternatively, the evaluation module 874 may provide only the metrics which the selection (extended use) module 878 may use to determine to the optimal uplink transmission configuration 862.

The selection (extended use) module 878 may apply the optimal uplink transmission configuration 328 to the beamforming module 880 using a weight $\overline{w}$ 871. The weight options do not necessarily have to include the magnitude differences between antennas. For example, the options may include a set of four 90 degree phase differences with equal magnitude and two antenna switching options. The options may be denoted as $$W = \left\{ \frac{1}{\sqrt{2}}\{1, 1\}, \frac{1}{\sqrt{2}}\{1, i\}, \frac{1}{\sqrt{2}}\{1, -1\}, \frac{1}{\sqrt{2}}\{1, -i\}, \{1, 0\}, \{0, 1\} \right\}.$$

Alternatively, the options may include only antenna switching, phases or combinations of magnitude, phase and switching. The beamforming module 880 may then send uplink transmissions using the applied optimal uplink transmission configuration 328.

The timing and control module 872 may send a request to a cycle adaptation module 882 to adapt 865 cycle adaptation parameters. The cycle adaptation module 882 may use the stored metrics $m_d$ 884 and calculated normalized relative metrics m 868 to obtain 877 autocorrelations r 888 for each uplink transmission configuration 314 over time. The cycle adaptation module 882 may then use the stored metrics $m_d$ 884, the calculated normalized relative metrics m 868, and the autocorrelations r 888 to determine an evaluation rate d 850. The cycle adaptation module 882 may send the evaluation rate d 850 to the timing and control module 872. The cycle adaptation module 872 may have a limited adaptation granularity of $2^n$. The evaluation rate d 850 may then be used by the timing and control module 872 for future uplink transmission configuration enhancement for future slots 863.

In the above discussion, auto-correlation was used as a representation of the consistency of an uplink transmission configuration's test in predicting good performance of that uplink transmission configuration over a longer time frame. Alternatively, other consistency measures may be used in the context of the present systems and methods. This representation was used as an example for optimizing the tradeoff between the costs of testing and the benefit of longer cycle lengths. The theory of this consistency, tradeoff and optimization, in general, can be explained in mathematical terms as follows.

Figure 9:
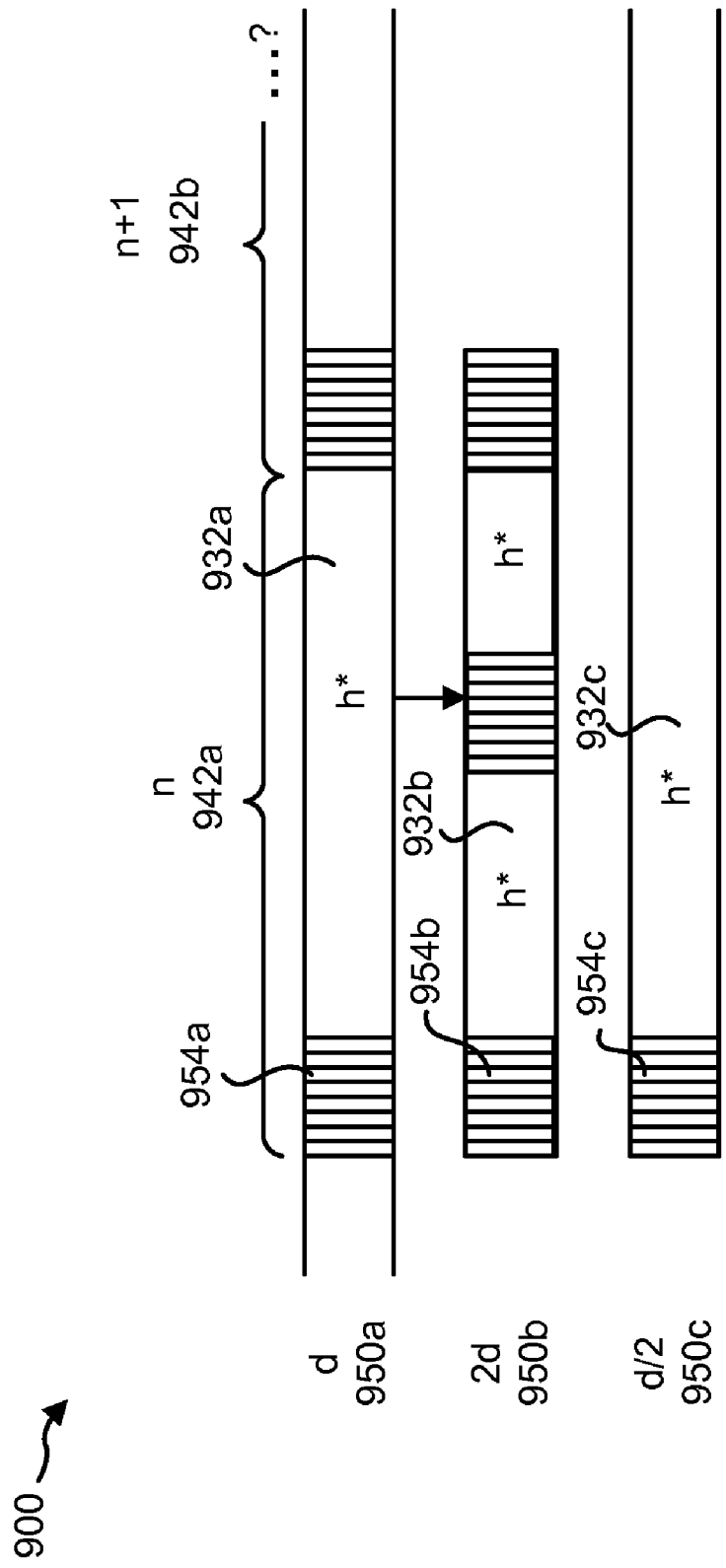
FIG. 9 illustrates cycles of transmit diversity uplink enhancement with varied evaluation rates.

FIG. 9 illustrates cycles 900 of transmit diversity uplink enhancement with varied evaluation rates 950. For a given cycle n 942a, the evaluation rate 950 for the next cycle n+1 942b may be increased or decreased depending on the hypothetical effect on a prior cycle. An increase and a decrease in the rate for one nominal cycle (i.e. at the current rate) are depicted in FIG. 9.

For a given evaluation rate d 950a, the measured mean transmit power for cycle n 942a given the power 348 per slot in the uplink transmission configuration test period 954a and the extended use period 932a (denoted by slot indices I(d,n) and U(d,n) respectively) may be found using Equation (13):

$$\overline{y}(d, n) \equiv \frac{d}{|H|L}\left[\sum_{i \in I(d,n)} y(h(i), i) + \sum_{i \in U(d,n)} y(h^*(n), i)\right]. \quad (13)$$

where I(h, i) is the transmit power with potential uplink transmission configuration h 314 at time index i, h* is the selected optimal uplink transmission configuration 328, and |H|L(1/d) is the cycle duration 342 in slots. A given evaluation rate d 950a may be compared with other evaluation rates via a cycle scaling factor α, applied as a multiplier to d 950a. For example, the doubled rate 950b (α=2) with the corresponding uplink transmission configuration testing period 954b and extended use period 932b is shown in FIG. 9. Likewise, the halved rate 950c (α=½) with the corresponding uplink transmission configuration testing period 954c and extended use period 932c is shown in FIG. 9.

The mean power difference is due to the overhead of a second uplink transmission configuration testing period and the use metric (adaptation of potential uplink transmission configuration 314 to the second use period). Thus, we may generalize the difference for a scaling factor α using Equation (14):

$$\Delta \bar{y}(a, d, n) \equiv \bar{y}(d, n) - \frac{1}{\alpha} \sum_{k=0}^{\alpha-1} \bar{y}(\alpha d, \alpha n + k). \quad (14)$$

Substituting Equation (13) for each of the two cycle rates in Equation (14) allows the derivation of Equation (15):

$$\Delta \bar{y}(a, d, n) = \frac{d}{|H|L} \left[ \sum_{i \in I(d,n)} y(h(i), i) + \sum_{i \in U(d,n)} y(h^*(n), i) \right] - \frac{1}{\alpha} \sum_{k=0}^{\alpha-1} \frac{\alpha d}{|H|L} \left[ \sum_{i=I(\alpha d, \alpha n+k)} y(h(i), i) + \sum_{i=U(\alpha d, \alpha n+k)} y(h^{*(k)}(\alpha n+k), i) \right]. \quad (15)$$

Combining terms for common time indices, grouping by potential uplink transmission configuration 314 and use periods, noting that the terms for k=0 cancel out the common parts of the faster and slower rates, and multiplying the terms by the length of the respective inner summations yields Equation (16):

$$\Delta \bar{y}(a, d, n) = d \sum_{k=1}^{\alpha-1} \left[ \frac{1}{|H|L} \sum_{i=I(\alpha d, \alpha n+k)} y(h^*(n), i) - \frac{1}{|H|} \sum_{h \in H} \left( \frac{1}{L} \sum_{i=H(\alpha d, \alpha n+k)} y(h, i) \right) + d \left( \frac{1-\alpha d}{\alpha d} \right) \right.$$
$$\left. \sum_{k=1}^{\alpha-1} \left[ \frac{1}{|H|L} \left( \frac{\alpha d}{1-\alpha d} \right) \sum_{i=U(\alpha d, \alpha n+k)} y(h^*(n), i) - y(h^{*(k)}(\alpha n+k), i) \right] \right] \quad (16)$$

Since the sum of the terms divided by the number of terms equals the mean, Equation (17) may be derived:

$$\Delta \bar{y}(a, d, n) = \frac{1}{\alpha} \sum_{k=1}^{\alpha-1} \left[ (\alpha d) \left( \bar{y}_d^- - \frac{1}{|H|} \sum_{h \in H} \bar{y}_{\alpha d}^-(h) \right) - (1 - \alpha d)(\bar{y}_d^+ - \bar{y}_{\alpha d}^+) \right]. \quad (17)$$

The means may thus be calculated using Equation (18):

$$\bar{y}_d^- \equiv \frac{1}{|H|L} \sum_{i=I(\alpha d, \alpha n+k)} [y(h^*(n), i)] \quad (18)$$

$$\bar{y}_{\alpha d}^- \equiv \frac{1}{L} \sum_{i=H(\alpha d, \alpha n+k)} [y(h, i)]$$

$$\bar{y}_d^+ \equiv \frac{1}{|H|L} \left( \frac{\alpha d}{1-\alpha d} \right) \sum_{i=U(\alpha d, \alpha n+k)} y(h^*(n), i)$$

$$\bar{y}_{\alpha d}^+ \equiv \frac{1}{|H|L} \left( \frac{\alpha d}{1-\alpha d} \right) \sum_{i=U(\alpha d, \alpha n+k)} y(h^{*(k)}, i).$$

The result of Equation (18) may be expressed directly in terms of the disadvantage metric $\bar{y}_d^-$ and the advantage metric $\bar{y}_d^+$ using Equation (19):

$$\Delta \bar{y}(\alpha, d, n) = \frac{1}{\alpha} \sum_{k=1}^{\alpha-1} [(\alpha d) \Delta \bar{y}^- - (1 - \alpha d) \Delta \bar{y}^+]. \quad (19)$$

The disadvantage metric $\bar{y}_d^-$ and the advantage metric $\bar{y}_d^+$ for each k are shown in Equation (20):

$$\Delta \bar{y}^- = \bar{y}_d^- - \frac{1}{|H|} \sum_{h \in H} \bar{y}_{\alpha d}^-(h) \quad (20)$$

$$\Delta \bar{y}^+ = \Delta \bar{y}_d^+ - \bar{y}_{\alpha d}^+.$$

The difference in using evaluation rate d 950a versus αd is due to the mean transmit power in the use and the uplink transmission configuration testing sub-periods of each cycle k=1 . . . α. The disadvantage metric $\Delta \bar{y}^-$ tends to discourage the use of a shorter cycle 242 whereas the advantage metric $\Delta \bar{y}^+$ tends to encourage the use of a shorter cycle 242 if the uplink transmission configuration selection would be better. The $\Delta \bar{y}^-$ value will be non-negative if the optimal uplink transmission configuration remains the same. But the $\Delta \bar{y}^+$ value will be zero if the uplink transmission configuration selection would remain the same. The equilibrium point is reached when $\Delta \bar{y}=0$. For α=2, this occurs when Equation (21) is satisfied:

$$\frac{\Delta \bar{y}^-}{\Delta \bar{y}^+} = \left( \frac{1}{\alpha d} - 1 \right). \quad (21)$$

Since the actual mean transmit power at the current evaluation rate 950 can be determined by measurement, the advantage and disadvantage metrics $\bar{y}_x^-$ and $\bar{y}_x^+$ may be determined for the current rate x. Given these differences, the metric of a potential uplink transmission configuration 314 may be defined as a relative quantity. The relative metric of a potential uplink transmission configuration 314 for cycle n 942 may be defined as the difference between the mean of the potential uplink transmission configuration 314 measured transmit power 340 during that cycle's test and the mean of the measured transmit power 246 over all uplink transmission configuration tests in that cycle 942, or 0 if it is worse than the mean. Thus, the relative metric may be defined using Equation (22):

$$\Delta m_d(h,n) = \min(0, \bar{y}_d^-(h,n) - \bar{y}_d^r(n)). \quad (22)$$

The reference term may be defined as the mean using Equation (23):

$$\bar{y}_d^r(n) \equiv \frac{1}{|H|} \sum_{h \in H} \bar{y}_d^-(h, n). \quad (23)$$

The relative metric may be bounded to be less than or equal to zero so that any potential uplink transmission configuration 314 worse than or equal to the mean has a metric of 0 while all others have negative metric values (i.e. less transmit power than the mean). The difference between the relative metrics of the two above average potential uplink transmission configurations 314 may be found using Equation (24):

$$\Delta \Delta m_d(h_0, h_1, n) = \bar{y}_d^-(h_0, n) - \bar{y}_d^-(h_1, n) = \Delta m_d(h_0, n) - \Delta m_d(h_1, n). \quad (24)$$

Because only one potential uplink transmission configuration 314 is used at a time, one of the rates is hypothetical. Therefore, the mean transmit power of either the faster or slower rate is not completely measurable.

FIG. 9 illustrates a nominal cycle where the evaluation rate d 950 is doubled to 2d 950b. Only the power during the hypothetical h* uplink transmission configuration sub-test of the latter shorter cycle can be determined by measurement (i.e. 1 on |H| of the disadvantage metric component for the double rate) in every case. In the case when h*' remains the same, the power during the latter use period can be determined by measurement as well. Nevertheless, the mean power during all hypothetical potential uplink transmission configurations 314 and the latter cycle for h*' can be estimated using the latest uplink transmission configurations for cycle n+1 942b in Equation (25):

$$\bar{y}_d^-(n+1) \cong \bar{y}_d^-(h^{*(n)}, n+1).$$

$$\bar{y}_{\alpha d}^-(h,n) \cong \bar{y}_d^-(h, n+1) \quad (25)$$

The k'th sub-cycle disadvantage metric for nominal cycle n 942a can be estimated using the actual difference in mean transmit powers from the latest uplink transmission sub-period for n+1 942b, and according to Equation (20), given Equation (23) and Equation (24), Equation (26) may be derived:

$$\Delta \bar{y}^-(\alpha, d, n, k) \cong \Delta m_d(h^{*(n)}, n+1). \quad (26)$$

Note that this backward estimator can be no worse than the forward estimation used to select the potential uplink transmission configuration h* to begin with. Moreover, for $\alpha=2$, the backward estimation can be applied to the hypothetical $2^{nd}$ use period. It can be no worse than the forward estimation that would have occurred. Equation (29) may be derived:

$$\bar{y}_d^+(n) \cong \bar{y}_d^-(h^{*(n)}, n+1).$$

$$\bar{y}_{\alpha d}^+(n) \cong \bar{y}_d^-(h^{*(n+1)}, n+1) \quad (27)$$

Thus, the k'th sub-cycle advantage metric can be estimated using the same cycle n+1 942b potential uplink transmission configuration 314 results. For $\alpha=2$, the selected potential uplink transmission configuration 314 h*(k) applied hypothetically backward, would have the same performance statistically as the hypothetically selected potential uplink transmission configuration 314, whatever it might have been. Thus, according to Equation (20), and given Equation (24), Equation (28) may be derived:

$$\Delta \bar{y}_d^+(\alpha, d, n, k) \cong \Delta m_d(h^{*(n)}, n+1) - \Delta m_d(h^{*(n+1)}, n+1). \quad (28)$$

Substituting the advantage metric estimate $\Delta \bar{y}_d^+(\alpha, d, n, k)$ from Equation (28) and the disadvantage metric estimate $\Delta \bar{y}_d^-(\alpha, d, n, k)$ from Equation (26) into Equation (19) gives Equation (29):

$$\Delta \bar{y}(\alpha, d, n) \cong \frac{1}{\alpha} \sum_{k=1}^{\alpha-1} \left[ \begin{array}{l} (2\alpha d - 1)\Delta m_d(h^{*(n)}, n+1) + \\ (1 - \alpha d)\Delta m_d(h^{*(n+1)}, n+1) \end{array} \right]. \quad (29)$$

At the equilibrium point of Equation (29), for $\alpha=2$, Equation (30) may be derived:

$$\frac{\Delta m_d(h^{*(n)}, n+1)}{\Delta m_d(h^{*(n+1)}, n+1)} = \left(\frac{1-2d}{1-4d}\right) \cong \frac{1}{1-2d}. \quad (30)$$

Alternatively, the evaluation rate d 950 may be halved to d/2 950c. The situation is conceptually reversed. Only the power during the actual uplink transmission configuration test 954c corresponding to h* of cycle n 942a can be determined by measurement in every case. In the case that h* remains the same, the power during the entire corresponding extended use period 932c can be determined by measurement as well. Nevertheless, the use power during the actual potential uplink transmission configuration tests 954c and the following extended use period 932c can be estimated using the latest uplink transmission configuration for cycle n+1 942b in the same manner as for the doubled evaluation rate 950b case except the advantage metric and disadvantage metric are reversed (negated) and the time scale is halved (because the candidate is now the slower rate). For both considerations above, a tradeoff decision to adjust the evaluation rate 950 may be optimally made during or at the end of the uplink transmission configuration testing period 260 because the measurements may be used to compare the actual cycle n measurements with hypothetical shorter and longer cycles 242.

A normalized relative merit of h may be defined using Equation (31):

$$m_d(h, n) \equiv \frac{\Delta m_d(h, n)}{\Delta m_d(h^{*(n)}, n)}. \quad (31)$$

If the potential uplink transmission configuration 314 h=h* (n+1), then m(h,n)=1. If the potential uplink transmission configuration h 314 is as good as the average potential uplink transmission configuration 314 or worse, then $m_d(h, n)=0$. If h is better than the average potential uplink transmission configuration 314, $m_d(h, n)$ is positive and less than or equal to 1. The equilibrium Equation (30) becomes Equation (32):

$$m_d(h^*, n) = \left(\frac{1-2d}{1-4d}\right). \quad (32)$$

However, Equation (32) only considers a cycle 242 retrospectively. Of interest is the next cycle's predicted normalized relative metric. Thus, a linear predictor may be considered using Equation (33):

$$\hat{m}_d(h, n) = -\sum_i a_i m_d(h, n) = -\sum_i a_i m_d(h, n-i). \quad (33)$$

For the least square error solution, Equation (34) may be derived:

$$\sum_i a_i r_d(h, i-j) = -r_d(h, j). \quad (34)$$

The autocorrelation of m (or covariance of m in the case where m has a zero mean) for h may then be found using Equation (35):

$$r_d(h, a) \equiv \frac{1}{N} \sum_{j=n-N+1}^{n} m_d(h, j) m_d(h, j+a). \quad (35)$$

The autocorrelation will be a value between 0 and 1, even if the potential uplink transmission configuration 314 was worse than the mean in the past because the metric values have been bounded to 0 above. Since the goal is to adapt the cycle rate to correspond to a time frame over which a tradeoff of disadvantage metric and advantage metric warrants use of that same potential uplink transmission configuration 314 but not necessarily longer, a single tap predictor as defined by Equation (36) may be used:

$$a_1 = -\frac{r_d(h, 0)}{r_d(h, 1)}. \quad (36)$$

The normalized relative merit of the optimal h*(n+1) is 1, by definition, and the autocorrelation at offset zero (0) may thus be approximated as 1 (particularly for a relatively short IIR filter or auto-correlation window). Alternatively, the normalized relative merit may be computed but approximation allows a simplified predictor. Therefore, the simple predictor may be defined using Equation (37):

$$m'_d(h^{*(n+1)}, n+1) = \frac{1}{r_d(h^{*(n+1)}, 1)}. \quad (37)$$

To maintain the equilibrium point of Equation (32), it may be desired that the cycle rate $2^a d$ is found using Equation (38):

$$r_{2_d^a}(h^*) = c_a(d) \quad (38)$$

where $$c_a(d) = \frac{1 - 2^{2-a}d}{1 - 2^{1-a}d} \cong 1 - 2^{1-a}d. \quad (39)$$

For the rate d, $c_0(d)$ may be desired, whereas $c_1(d)$ would correspond to the slower d/2 and $c_{-1}(d)$ would correspond to the faster 2d. For example, for u=42, d=1/42, and α=2, we have $c_{-1} \approx 0.89$, $c_0 \approx 0.95$ and $c_1 \approx 0.98$. If the values of d are limited by factors of 2, since α=2, and because a rate that is further from the equilibrium than the current rate is not desirable to be chosen, a hysteresis (c') or condition may be applied that the new rate would not be further from its equilibrium point. In general, this may be defined using Equation (40):

$$c'_{a-1}(d) \leq r_{\alpha^{1-a}d}(h^*) \leq c'_{a+1}(d). \quad (40)$$

If the autocorrelation is smaller than $c'_{-1}$, then the optimal cycle may be shorter. However, if the autocorrelation is larger than $c'_{+1}$, the optimal cycle may be longer.

Figure 10:
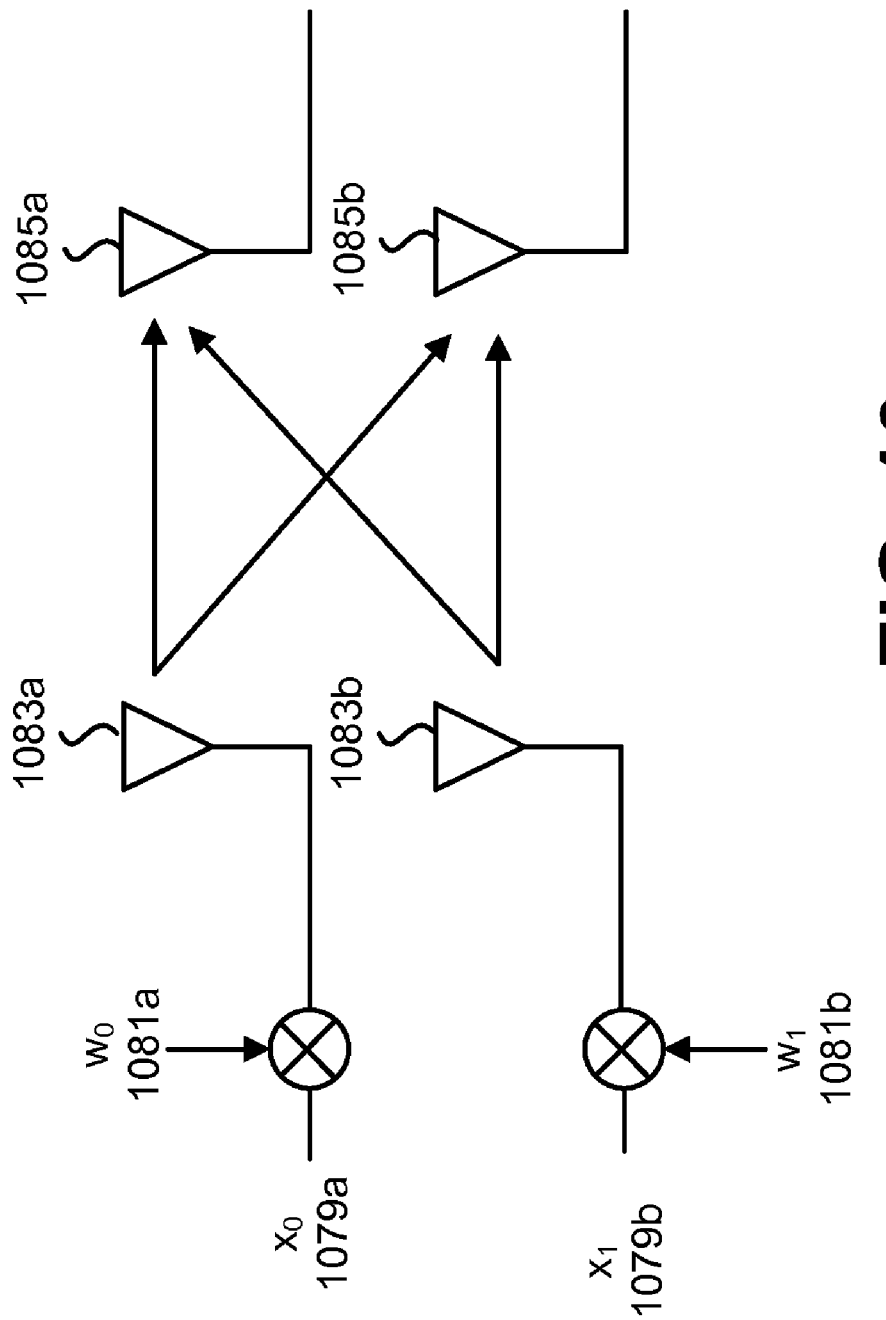
FIG. 10 illustrates beamforming with multiple antennas.

FIG. 10 illustrates beamforming with multiple antennas. The beamforming may correspond to an uplink transmission configuration. A first weight $w_0$ 1081a may be applied to a first signal $x_0$ 1079a to be transmitted and a second weight $w_1$ 1081b may be applied to a second signal $x_1$ 1079b to be transmitted. The first signal 1079a and the second signal 1079b may be the same signal. Each weight 1081 may adjust the phase and signal strength of the signals 1079 to be transmitted. The first signal 1079a may then be transmitted using a first antenna 1083a and the second signal 1079b may be transmitted using a second antenna 1083b. Multiple antennas 1085a-b may receive the transmitted signals. For example, a first receiving antenna 1085a may receive the first transmitted signal and the second transmitted signal.

Figure 11:
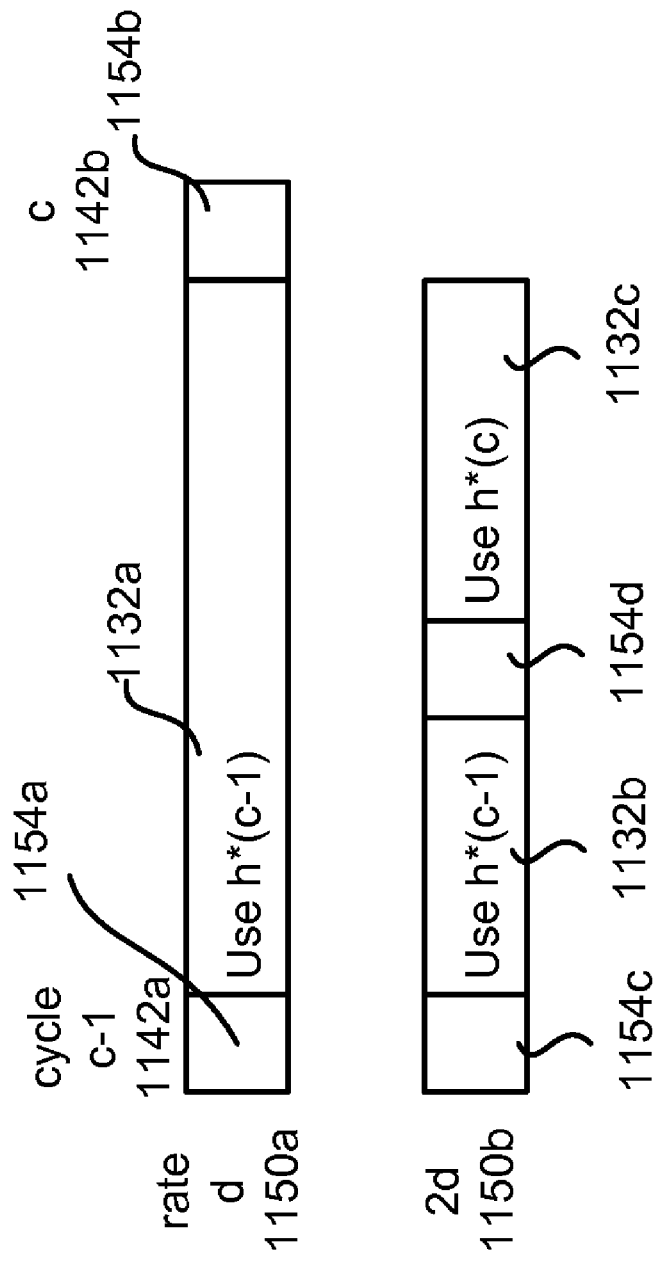
FIG. 11 illustrates the advantage metric and disadvantage metric for uplink transmission enhancement.

FIG. 11 illustrates the advantage metric and disadvantage metric for uplink transmission enhancement. For an evaluation rate d 1150a during a cycle c−1 1142a, an uplink transmission configuration testing period 1154a is followed by an extended use period 1132a. For the next cycle c 1142b, another uplink transmission configuration testing period 1154b may occur.

By doubling the evaluation rate d 1150a to 2d 1150b, an additional extended use period 1132c is achieved over the cycle duration 1142a in addition to the first extended use period 1132b. The additional extended use period 1132c may provide an advantage metric because a more optimal uplink transmission configuration h*(c) may be chosen versus using the uplink transmission configuration h*(c−1) used during the extended use period 1132a of the entire cycle 1142a. However, by doubling the evaluation rate 1150, an uplink transmission configuration testing period 1154d is required in addition to the original uplink transmission configuration testing period 1154c. The additional uplink transmission configuration testing period 1154d may provide a disadvantage metric because the wireless communication device 104 is using power to test potential uplink transmission configurations 314 instead of using an optimal (or near optimal) uplink transmission configuration 328.

Figure 12:
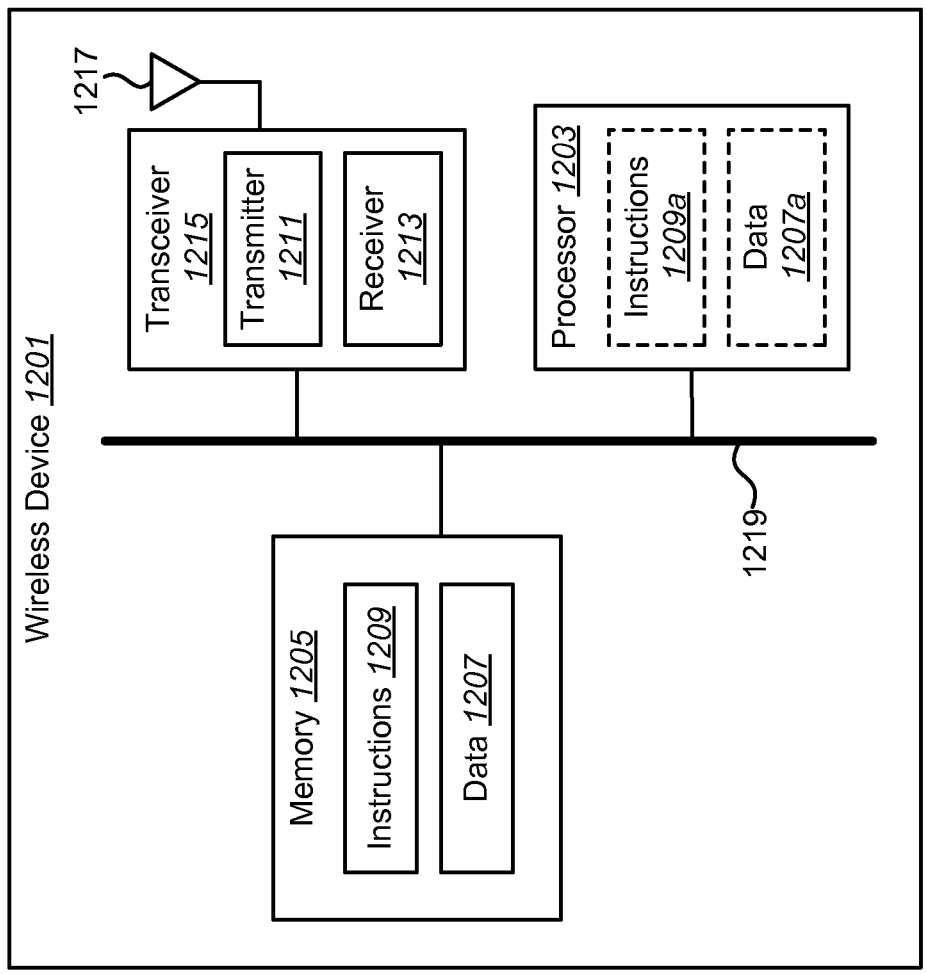
FIG. 12 illustrates certain components that may be included within a wireless device that is configured in accordance with the present disclosure.

FIG. 12 illustrates certain components that may be included within a wireless device 1201. The wireless device 1201 may be a wireless communication device 104.

The wireless device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless device 1201 of FIG. 12, in an alternative configuration, a combination of processors (e.g., an ARM and DSP) could be used.

The wireless device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The wireless device 1201 may also include a transmitter 1211 and a receiver 1213 to allow transmission and reception of signals to and from the wireless device 1201. The transmitter 1211 and receiver 1213 may be collectively referred to as a transceiver 1215. An antenna 1217 may be electrically coupled to the transceiver 1215. The wireless device 1201 may also include (not shown) multiple transmitters, multiple receivers, multiple transceivers and/or multiple antenna.

The various components of the wireless device 1201 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for uplink transmit diversity, the method comprising:
   selecting two or more potential uplink transmission configurations;
   evaluating each potential uplink transmission configuration;
   selecting an uplink transmission configuration based on the evaluation;
   determining metrics of the selected uplink transmission configuration;
   adjusting cycle adaptation parameters comprising at least one of an uplink transmission testing period, an evaluation period, and an extended use period; and
   applying the selected uplink transmission configuration for the extended use period on a wireless communications device.

2. The method of claim 1, further comprising determining the two or more potential uplink transmission configurations.

3. The method of claim 1, wherein each potential uplink transmission configuration comprises a phase configuration.

4. The method of claim 1, wherein each potential uplink transmission configuration comprises an antenna configuration.

5. The method of claim 1, wherein an uplink transmission configuration specifies beamforming techniques for the wireless communications device.

6. The method of claim 1, wherein selecting the uplink transmission configuration based on the evaluation comprises selecting an optimal uplink transmission configuration.

7. The method of claim 1, wherein evaluating each potential uplink transmission configuration comprises:
   performing an uplink transmission configuration test for a current cycle to obtain a mean transmit power;
   computing a relative metric of each potential uplink transmission configuration;
   computing a normalized relative metric for each potential uplink transmission configuration; and
   calculating an autocorrelation of the normalized relative metric for each potential uplink transmission configuration.

8. The method of claim 7, wherein performing an uplink transmission configuration test comprises using the uplink transmission configuration for uplink transmissions during the uplink transmission testing period.

9. The method of claim 1, wherein the wireless communications device comprises two or more antennas.

10. The method of claim 9, wherein the wireless communications device is configured to operate using multiple-in multiple-out (MIMO).

11. A wireless device configured for uplink transmit diversity, comprising:
   a processor;
   memory in electronic communication with the processor;
   instructions stored in the memory, the instructions being executable by the processor to:
      select two or more potential uplink transmission configurations;
      evaluate each potential uplink transmission configuration;
      select an uplink transmission configuration based on the evaluation;
      determine metrics of the selected uplink transmission configuration;
      adjust cycle adaptation parameters comprising at least one of an uplink transmission testing period, an evaluation period, and an extended use period; and
      apply the selected uplink transmission configuration for the extended use period.

12. The wireless device of claim 11, wherein the instructions are further executable to determine the two or more potential uplink transmission configurations for evaluation.

13. The wireless device of claim 11, wherein each potential uplink transmission configuration comprises a phase configuration.

14. The wireless device of claim 11, wherein each potential uplink transmission configuration comprises an antenna configuration.

15. The wireless device of claim 11, wherein an uplink transmission configuration specifies beamforming techniques for the wireless device.

16. The wireless device of claim 11, wherein selecting the uplink transmission configuration based on the evaluation comprises selecting an optimal uplink transmission configuration.

17. The wireless device of claim 11, wherein evaluating each potential uplink transmission configuration comprises:
   performing an uplink transmission configuration test for a current cycle to obtain a mean transmit power;
   computing a relative metric of each potential uplink transmission configuration;
   computing a normalized relative metric for each potential uplink transmission configuration; and
   calculating an autocorrelation of the normalized relative metric for each potential uplink transmission configuration.

18. The wireless device of claim 17, wherein performing an uplink transmission configuration test comprises using the uplink transmission configuration for uplink transmissions during the uplink transmission testing period.

19. The wireless device of claim 11, wherein the wireless device is a mobile station with two or more antennas.

20. The wireless device of claim 19, wherein the mobile station is configured to operate using multiple-in multiple-out (MIMO).

21. A wireless device configured for uplink transmit diversity, comprising:
   means for selecting two or more potential uplink transmission configurations;
   means for evaluating each potential uplink transmission configuration;
   means for selecting an uplink transmission configuration based on the evaluation;
   means for determining metrics of the selected uplink transmission configuration;
   means for adjusting cycle adaptation parameters comprising at least one of an uplink transmission testing period, an evaluation period, and an extended use period; and
   means for applying the selected uplink transmission configuration for the extended use period.

22. The wireless device of claim 21, wherein each potential uplink transmission configuration comprises at least one of a phase configuration or an antenna configuration or specifies a beamforming technique.

23. The wireless device of claim 21, wherein the means for evaluating each potential uplink transmission configuration comprises:
   means for performing an uplink transmission configuration test for a current cycle to obtain a mean transmit power;
   means for computing a relative metric of each potential uplink transmission configuration;
   means for computing a normalized relative metric for each potential uplink transmission configuration; and
   means for calculating an autocorrelation of the normalized relative metric for each potential uplink transmission configuration.

24. The wireless device of claim 23, wherein the means for performing the uplink transmission configuration test comprises means for using the uplink transmission configuration for uplink transmissions during the uplink transmission testing period.

25. A computer-program product for a wireless device configured for uplink transmit diversity, the computer-program product comprising a computer-readable medium having instructions thereon, the instructions comprising:
   code for selecting two or more potential uplink transmission configurations;
   code for evaluating each potential uplink transmission configuration;
   code for selecting an uplink transmission configuration based on the evaluation;
   code for determining metrics of the selected uplink transmission configuration;

code for adjusting cycle adaptation parameters comprising at least one of an uplink transmission testing period, an evaluation period, and an extended use period; and code for applying the selected uplink transmission configuration for the extended use period.

26. The computer-program product of claim 25, wherein each potential uplink transmission configuration comprises at least one of a phase configuration or an antenna configuration or specifies a beamforming technique.

27. The computer-program product of claim 25, wherein the code for evaluating each potential uplink transmission configuration comprises:

code for performing an uplink transmission configuration test for a current cycle to obtain a mean transmit power;

code for computing a relative metric of each potential uplink transmission configuration;

code for computing a normalized relative metric for each potential uplink transmission configuration; and code for calculating an autocorrelation of the normalized relative metric for each potential uplink transmission configuration.

28. The computer-program product of claim 27, wherein the code for performing the uplink transmission configuration test comprises code for using the uplink transmission configuration for uplink transmissions during the uplink transmission testing period.

* * * * *